Jan. 17, 1950     T. G. ROSS     2,494,899
EXPANDING MANDREL
Filed Sept. 2, 1947     3 Sheets-Sheet 1
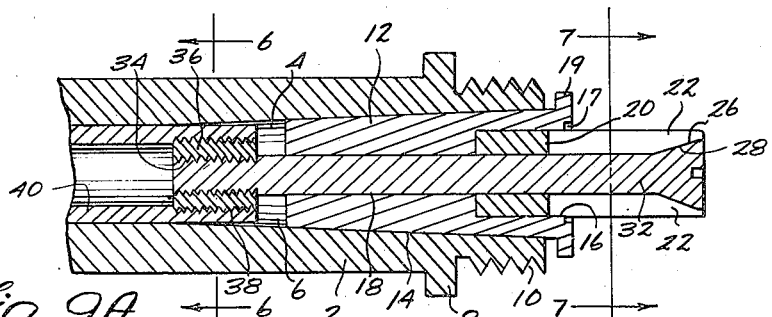
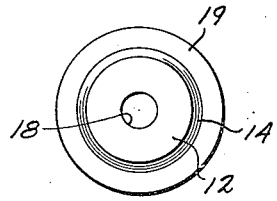
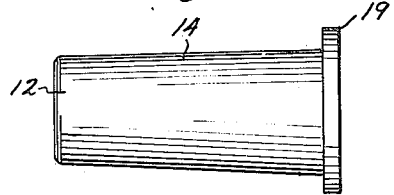
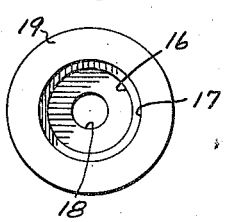
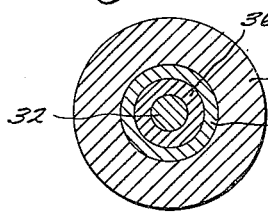
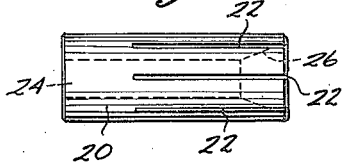
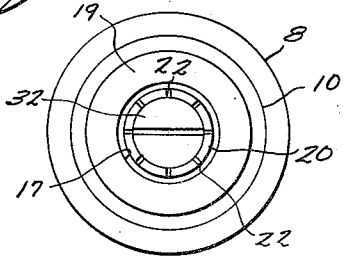
INVENTOR.
Thomas G. Ross,
BY Victor J. Evans & Co.
ATTORNEYS Jan. 17, 1950 T. G. ROSS 2,494,899
EXPANDING MANDREL
Filed Sept. 2, 1947 3 Sheets-Sheet 2
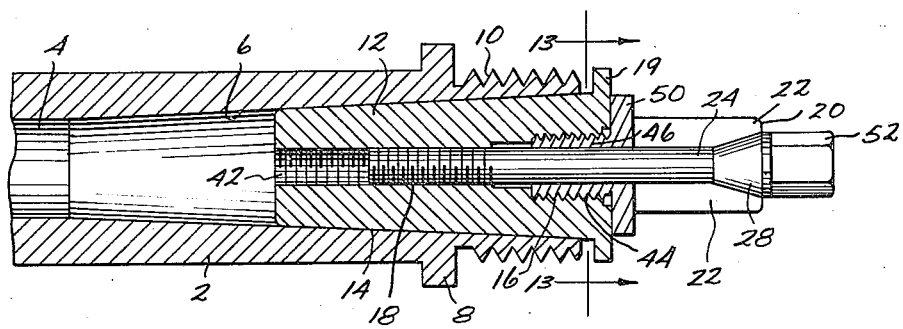
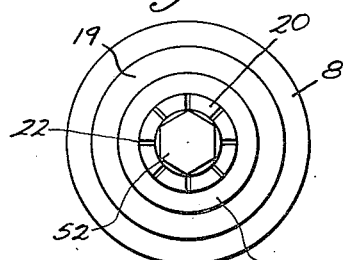
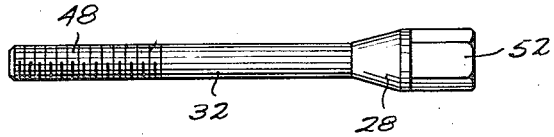
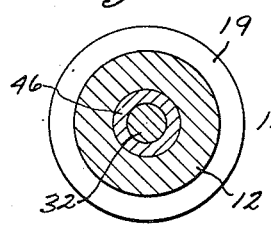
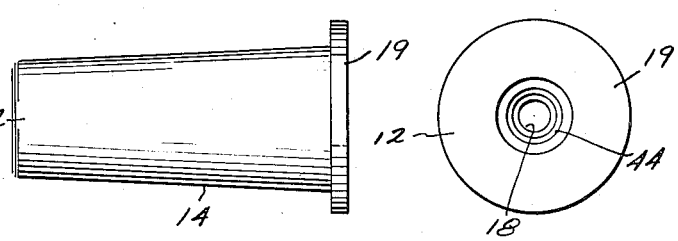
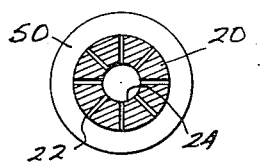
INVENTOR.
Thomas G. Ross,
BY Victor J. Evans & Co.
ATTORNEYS

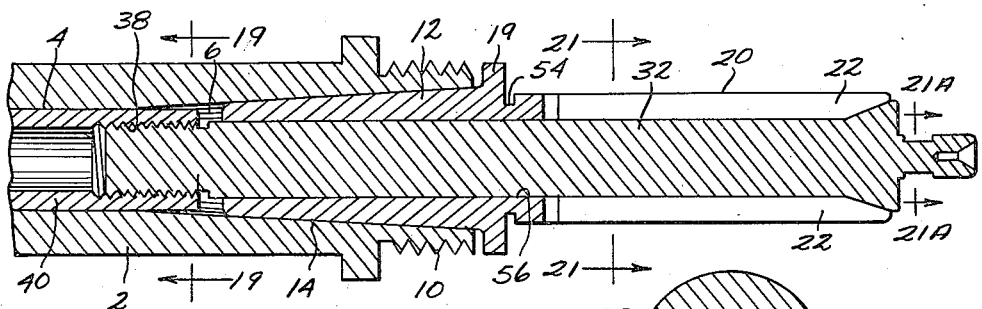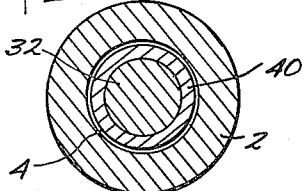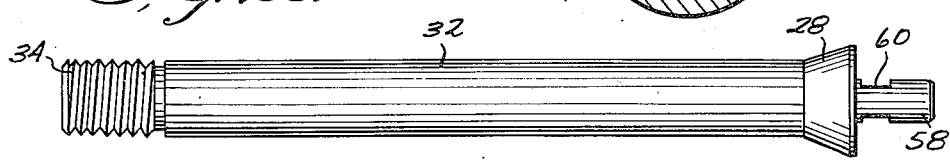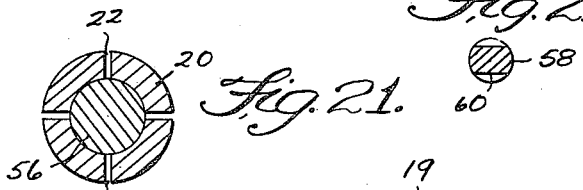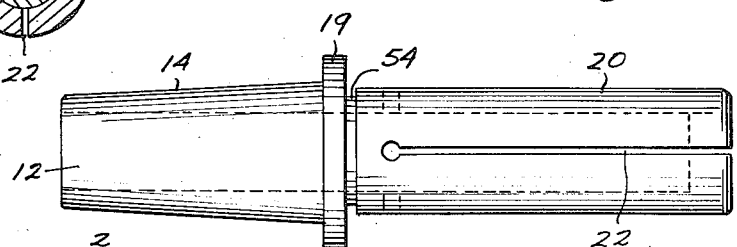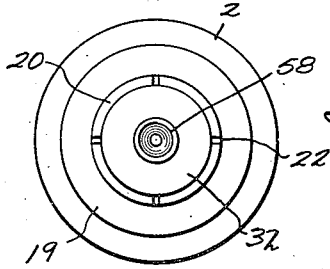
INVENTOR.
Thomas G. Ross,
BY Victor J. Evans & Co.
ATTORNEYS Patented Jan. 17, 1950

2,494,899

UNITED STATES PATENT OFFICE 2,494,899

EXPANDING MANDREL

Thomas G. Ross, Milwaukee, Wis.

Application September 2, 1947, Serial No. 771,579

3 Claims. (Cl. 279—2)

My present invention relates to an improved expanding mandrel of the type designed for use in handling work in fast production in turning, facing, grooving, counterboring and the like, on a lathe, drill press, milling machine or other tool for holding work while it is being machined, and for fast and easy mounting and demounting of work on and off the mandrel without stopping the machine to do so and for fast and simple setup on the machines.

The mandrel was designed as a simple work holding device that can be quickly mounted on most modern machine shop equipment. The design of the mandrel can be changed so as to accommodate any size of work or any type of machine, large or small, or to be used in conjunction with many types of standard work holding devices. When properly constructed and installed, it assures almost absolute concentricity in work.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a longitudinal sectional view through the assembled mandrel.

Fig. 2 is a plan view of the actuating pin.

Fig. 3 is an end view of the anchor plug.

Fig. 4 is a plan view thereof.

Fig. 5 is an end view at the opposite end.

Figs. 6 and 7 are sectional views at lines 6—6 and 7—7 of Fig. 1.

Fig. 8 is a plan view of the mandrel body.

Fig. 9 is an end elevational view of the assembled mandrel.

Fig. 9a is a plan view of the adapter plug.

Fig. 10 is a longitudinal sectional view of an assembled modified mandrel.

Fig. 11 is an end elevational view.

Fig. 12 is a plan view of the actuating pin.

Fig. 13 is a sectional view at lines 13—13 of Fig. 10.

Fig. 14 is a plan view of the mandrel body.

Fig. 15 is an end view thereof.

Fig. 16 is a sectional view at lines 16—16 of Fig. 17.

Fig. 17 is a plan view of the mandrel body.

Fig. 18 is a longitudinal sectional view of a further modified mandrel.

Fig. 19 is a sectional view at lines 19—19 of Fig. 18.

Fig. 20 is a plan view of the actuating pin.

Fig. 21 is a sectional view at line 21—21 of Fig. 18.

Fig. 21a is a sectional view at line 21a—21a of Fig. 18.

Fig. 22 is a plan view of the combined mandrel body and the anchor plug.

Fig. 23 is an end elevational view thereof.

Referring now to the drawings and specifically to Figs. 1 through 9a, I have illustrated the usual lathe spindle 2 having its interior bore 4 tapered at 6 and fashioned with an exterior collar 8 and threaded at 10. The anchor plug 12 of the device of my invention has a tapered wall 14 to fit snugly into the spindle, and is formed with a recess or counter bore 16 with a circular groove and a longitudinal bore 18 and a flange 19. The mandrel body 20 formed with slots 22 and the inner bore 24 flaring at 26 seats the tapered conical face 28 of the head 30 of the actuating pin 32 threaded at 34 and extending through the bore 18.

An adapter plug 36 receives the pin and being interiorly and exteriorly threaded will engage the drilled end 38 of a tube 40.

In Figs. 10 through 17, I have shown a modified type of mandrel wherein the spindle 2 receives the anchor plug 12 having its bore 18 threaded at 42 and its counter bore 16 threaded at 44. The mandrel body is threaded at 46 to engage the counter bore 44 and the pin 32 is threaded at 48 to engage the threads 42 of bore 18. A collar 50 on the mandrel body bears against the flange 19 and the head 28 of the pin is fashioned with an angularly faced nut 52 to receive a wrench.

In Figs. 18 through 23, the anchor plug 12 and the mandrel body 20 are made integral at 54 and having a longitudinal bore 56 for the actuating pin 32. In this type the pin is of greater diameter and the stud 58 is squared at 60 to receive a wrench.

From the above it will be apparent that the mandrel was designed for and as a production tool for fast handling of work and the simplicity of design makes possible a fast and accurate setup on machine in which work can be mounted on and removed from the mandrel without stopping the machine and in which accuracy in concentricity is almost absolute. If desired the mandrel can be made smaller (ground) without endangering effective and accurate operation and in use the mandrel can be expanded, to hold work, from either end.

The mandrel is adaptable to almost every type of machine shop equipment, and can be made adaptable to work or operate on, or in conjunction with all types of collet closing devices, and work holding units. The mandrel body (on certain types of the mandrel) is interchangeable, a large body can be substituted for a smaller size, a long, for a short one, etc., without discarding the remaining parts of the complete unit, and the adjustment of mandrel is made simple, by elimination of almost all the need for adjustment; any adjusting necessary can be made at set-up.

The parts of the mandrel are so designed as to make assembly of them into a unit foolproof, and keep replacement of the broken parts at minimum cost.

The conical or beveled surfaces of the actuating pin and the mandrel body are designed to prevent "freezing" or locking together under pressure from work and the actuating pins of most types of the mandrel have center holes in the outside ends, so that a tailstock center can be used for support of the mandrel, in case cuts on work are heavy. The range of expansion on the mandrel is held to a minimum, to assure tension and accuracy, and the mandrel is so designed, that it will expand most at the outer end; this action draws the work against the shoulder for more holding power and accuracy. The undercuts or recesses at the ends of the slots around the mandrel body increase flexibility and serve as a place to catch any dirt or dust from work so as not to hinder the accuracy or operation of mandrel, and the drilled holes at the ends of the slots, somewhat larger than the slots prevent the tines of the mandrel from teeing at the corners, from the constant expanding and collapsing of the mandrel, and the tapered parts of the mandrel are so designed, to produce the most effective metal to metal grip, and to form an anchor or base on which the other parts of the mandrel are mounted, and to enable the complete mandrel to roll or rotate in the same direction or manner as the spindle of the machine into which it (mandrel) is set.

The adapter plug is designed to always remain the correct distance from the inner end of the tapered base, or anchor plug, to minimize adjustment, and the complete mandrel assembly is not confined to any one set of specifications as to its size, width, length and breadth. The principle of the tool can be adapted to be used in an unlimited number of ways. Many of these ways are at present being reduced to practice.

Having thus fully described my invention, what I claim as new and desire to secure by Letters Patent is:

1. In a mandrel for a lathe spindle having a bore with a conical-shaped outer end and having a torque tube therein, the combination which comprises an anchor plug having a conical-shape outer surface corresponding with the conical-shape outer end of the bore of the spindle and having a bore with a counterbore in the outer end, an actuator pin with a conical shaped head and having a threaded inner end extended through the said anchor plug, an adapter plug with a threaded outer surface and having a threaded bore threaded on the inner end of the adapter pin and positioned to be threaded into the torque tube of the spindle, and a mandrel body having a bore with a conical-shaped outer end corresponding with the conical-shaped head of the actuator pin and having spaced slits extended inwardly from the said outer end positioned on the outer end of the actuator pin and extended into the said counterbore of the anchor plug, the outer end of said actuator pin being provided with tool engaging means whereby the actuator pin is screwed into the adapter plug to extend the mandrel body.

2. A mandrel for a work-driving spindle having a bore with a tapered outer end and having a torque tube therein, said mandrel comprising, an anchor plug having a tapered outer surface shaped to correspond with the outer end of the spindle bore for reception therein, said plug also having a bore with a counterbore at the outer end thereof, an expandible mandrel body extended into the counterbore of said plug for axial sliding movement therein and having a bore with a tapered outer end, an actuator pin extended through said body and said plug and having a tapered head receivable within the outer end of said body bore, and means carried by the inner end of said pin for coaction with the torque tube of the spindle whereby said mandrel body may be firmly seated in the counterbore of said plug and may be expanded upon relative axial shifting of said pin and torque tube.

3. A mandrel for a work-driving spindle having a bore with a tapered outer end and having a torque tube therein, said mandrel comprising, an anchor plug having a tapered outer surface shaped to correspond with the outer end of the spindle bore for reception therein, said plug also having a bore with a counterbore at the outer end thereof, a mandrel body extended into the counterbore of said plug for axial sliding movement therein and having a bore with a tapered outer end, said body being formed with a series of spaced slots extending inwardly from the outer end thereof to provide expandible tines, an actuator pin extended through said body and said plug and having a tapered head receivable within the outer end of said body bore, and an adapter plug carried by the inner end of said pin for threaded engagement with the torque tube of the spindle whereby said mandrel body may be firmly seated in the counterbore of said plug and may be expanded upon relative axial shifting of said pin and torque tube.

THOMAS G. ROSS.

REFERENCES CITED

The following references are of record in the file of this patent:

UNITED STATES PATENTS

| Number | Name | Date |
| --- | --- | --- |
| 1,431,761 | Schlaupitz | Oct. 10, 1922 |
| 2,435,480 | Tuttle | Feb. 3, 1948 |